United States Patent
Wagh et al.

(10) Patent No.: US 11,034,509 B2
(45) Date of Patent: Jun. 15, 2021

(54) REUSABLE AND RECYCLABLE STEEL SADDLE FOR STORAGE AND TRANSPORTING HEAVY MATERIALS

(71) Applicant: GREEWO NOBLEPACK PRIVATE LIMITED, Pune (IN)

(72) Inventors: Rajendra Eknath Wagh, Kharadi Pune (IN); Keshav Dattatray Kudale, Ambegaon Koregaon (IN)

(73) Assignee: GREEWO NOBLEPACK PRIVATE LIMITED, Pune (IN)

( * ) Notice: Subject to any disclaimer, the term of this patent is extended or adjusted under 35 U.S.C. 154(b) by 0 days.

(21) Appl. No.: 16/463,283

(22) PCT Filed: Nov. 18, 2017

(86) PCT No.: PCT/IN2017/050540
§ 371 (c)(1),
(2) Date: May 22, 2019

(87) PCT Pub. No.: WO2018/096554
PCT Pub. Date: May 31, 2018

(65) Prior Publication Data
US 2019/0308802 A1  Oct. 10, 2019

(30) Foreign Application Priority Data
Nov. 22, 2016  (IN) .............................. 201621039811

(51) Int. Cl.
*B65D 85/66* (2006.01)
*B65H 49/38* (2006.01)
(Continued)

(52) U.S. Cl.
CPC ............. *B65D 85/66* (2013.01); *B65H 49/38* (2013.01); *F16M 11/22* (2013.01); *F16M 13/00* (2013.01); *F16M 2200/08* (2013.01)

(58) Field of Classification Search
CPC ...... B65D 85/66; B65H 49/38; Y02W 30/807; Y02W 30/80; F16M 13/00; F16M 2200/08; F16M 11/22; B60T 3/00
(Continued)

(56) References Cited

U.S. PATENT DOCUMENTS 2,472,952 A * 6/1949 Lennard ................ B62B 5/0083
280/35
3,379,314 A * 4/1968 Canning .................... B63C 5/04
211/59.4

(Continued)

FOREIGN PATENT DOCUMENTS

| EP | 0640541 B1 | 1/1998 |
|---|---|---|
| JP | 4563295 B2 | 10/2010 |
| JP | 5942398 B2 | 6/2016 |

OTHER PUBLICATIONS

Stainless Steel-High Temperature Resistance; by Azo; Jan. 8, 2002; https://www.azom.com/article.aspx?ArticleID=1175 (Year: 2002).*

(Continued)

*Primary Examiner* — Ingrid M Weinhold
(74) *Attorney, Agent, or Firm* — Hamre, Schumann, Mueller & Larson, P.C.

(57) ABSTRACT

The embodiment herein discloses a steel stand known as steel saddle/pallets/skid, which comprises of comprises of at least two pair of inner legs (02), at least two pair of outer legs (01), a load caring load carrying plate (04), a bridge strip (03) and cushioning/cushion pad used for handling, carrying, supporting, storing and transporting steel, steel coils, pipes, and/or such other heavy materials at variable temperature while travelling for a long distance. The load carrying load carrying plate is placed on top of the four-hollow metal support stand (two inner legs and two outer legs) at opposite end, both end joined together through a bridge strip by welding.

6 Claims, 2 Drawing Sheets

(51) Int. Cl.
*F16M 13/00* (2006.01)
*F16M 11/22* (2006.01)

(58) Field of Classification Search
USPC .................... 410/49; 248/346.5, 346.01, 49;
211/85.18
See application file for complete search history.

(56) References Cited

U.S. PATENT DOCUMENTS

| | | | | |
|---|---|---|---|---|
| 3,586,285 A * | 6/1971 | Modzelewski | ........... | B63C 5/02 |
| | | | | 248/314 |
| 3,889,831 A * | 6/1975 | Davis | .............. | B21C 47/22 |
| | | | | 414/433 |
| 4,392,627 A * | 7/1983 | van den Broek | ......... | B63C 5/02 |
| | | | | 248/176.1 |
| 4,468,150 A * | 8/1984 | Price | .................. | B63C 5/02 |
| | | | | 114/44 |
| 4,759,660 A * | 7/1988 | Corbett | ................. | B63C 5/02 |
| | | | | 248/354.3 |
| 4,801,152 A * | 1/1989 | Elliott | ................ | B60B 33/00 |
| | | | | 114/344 |
| 5,290,124 A * | 3/1994 | Pavlescak | ............... | B63C 15/00 |
| | | | | 405/3 |
| 5,456,190 A * | 10/1995 | Good | ................. | B65D 19/44 |
| | | | | 108/53.3 |
| 5,501,058 A | 3/1996 | Sonoyama et al. | | |
| 5,884,885 A * | 3/1999 | Schmidt, Jr. | ............ | B63B 23/62 |
| | | | | 114/259 |
| 6,142,440 A | 11/2000 | Gratz et al. | | |
| 6,585,224 B1 * | 7/2003 | Schmidt | ................. | B63H 20/36 |
| | | | | 108/55.1 |
| 6,648,281 B1 * | 11/2003 | Lake | ...................... | A62C 33/06 |
| | | | | 248/49 |
| 7,025,531 B1 * | 4/2006 | Fournier | .................. | B63C 5/02 |
| | | | | 114/44 |
| 8,926,217 B1 * | 1/2015 | Smith | ....................... | B63C 5/02 |
| | | | | 248/176.1 |
| 9,487,328 B2 * | 11/2016 | Edwards | ............ | B65D 19/0095 |
| 2007/0039909 A1 * | 2/2007 | DeMent | ................... | B60P 7/12 |
| | | | | 211/59.4 |
| 2011/0248141 A1 * | 10/2011 | Lee | ......................... | B21C 47/00 |
| | | | | 248/346.5 |
| 2015/0097098 A1 | 4/2015 | Chi | | |

OTHER PUBLICATIONS

International Search Report and Written Opinion; International Patent Application No. PCT/IN2017/050540; dated Feb. 21, 2018 (9 pages).
International Preliminary report on Patentability; International Patent Application No. PCT/IN2017/050540; dated Mar. 25, 2019 (8 pages).

* cited by examiner

REUSABLE AND RECYCLABLE STEEL SADDLE FOR STORAGE AND TRANSPORTING HEAVY MATERIALS

BACKGROUND

Technical Field of Invention

The embodiments herein generally relate to a saddle and particularly relates to a saddle with a varying load carrying capability. The embodiments herein more particularly relate to a saddle with a modular assembly to adjust according to varying load in real time.

DESCRIPTION OF RELATED ART

The world is under continuous tremendous pressure because of problem arising from global warming and is facing unceasing environmental challenges due to manmade interventions in ecosystem in form of deforestation, release of polluted water in rivers, emission of hazardous gases, disposal of hazardous substance etc. This has given rise to an adverse situation such as increase in earth temperature, frequent landslides, droughts in some geographical area due to less or nil rainfall and very heavy rainfall in other area, where both areas are geographically not fit to handle the situation, increase in health issue, decrease in quality of breathing air, lowering of ground water level and such other similar issue. Deforestation is the main reason in changing the pattern of the oxygen cycle on earth. If no correct measures are taken in present scenario, it may give rise to irreversible and irrevocable crisis owing to which earth will not sustain life in near future.

Conventionally, the saddle or also known as pallets or skids were mostly manufactured from different grades of wood, rubber, plastic and other composite material which is environmentally not conducive and is economically depreciative. Numerous challenges are being faced by the industries on a day to day basis while using such conventional form of saddle, such as:
  i. Availability of raw material for manufacturing the saddle/pallets/skid;
  ii. Complex manufacturing process;
  iii. High cost of steel standion on per piece/set leading to requirement of higher operational and capital investment, which has further dire consequence on other manufacturing or other aspect of the industry;
  iv. Reduced shelf life of the conventional stand as with continuous and rigorous usage the strength of the steel stand diminishes, which again adds to the expenses;
  v. Maintaining higher degree of safety standard for storage/inventory with routine quality analysis inspection of the steel stand to be conducted by experts, which is difficult to track after multiple use;
  vi. Very less flexibility in handling very high loads or materials of incompatible sizes and leading to wastage of considerable time in positioning while loading of the materials; vii. Generation of unwanted side conventional stands;
  viii. Susceptible to wet humid climate, heat, fire etc.
  ix. Creating environmental issues after disposal In addition to the above, the prior arts require a specific facet of the ground surface while using conventional saddle. Without proper ground surface, there is very high probability of tilting or movement of the loaded materials especially when placed on irregular surface, which may result in unwanted accidents and slippage. Furthermore, reconstructing, restructuring of the broken part is costly and often not feasible. Therefore, usually due to spoiling of one part of the saddle other supporting structure is also wasted. Hence there is a need to develop and design new saddle from different sustainable and durable material which overcomes the above discussed shortcoming.

Presently, the coils ranging in size from 5000 lbs to over 60,000 lbs or more are being stored and transported on the saddle made from different grades of wood, hardwood, cushion, plastics, other high grades material or combination thereof while facing above discussed difficulties. To overcome said difficulties, the present invention has been designed in the manner that it replaces wooden, rubber, plastic and other composite material which were conventionally used for manufacturing the saddle with steel and more particularly is made from treated steel or treated stainless steel or high quality graded steel which is free from rusting and corrosive factors, and have been intricately designed to store and transport steel stands and other suitable heavy materials without affecting its quality at a variable temperature during transportation over a long distance. The material used in manufacturing is easily available at a comparatively economical cost with generation of no hazardous by-steel stands during its manufacturing and is recyclable and reusable with negligible waste. The present invention has innovative features in its configuration, design, construction, assembly and material used for its manufacturing when compared to conventional saddle/pallets/skids or presently used saddle/pallets/skids.

The present invention takes reference of few prior arts which are mentioned below:

Patent No EP0640541B1 & U.S. Pat. No. 5,501,058 titled "Coil packing line equipped with independent reciprocating carriage" discloses a stationary skid having a V shaped support for supporting the coil. The patent does not claim the structure of the skid other than it being of V shaped support and is different from the present invention in respect to its design and structure.

Patent No JP4563295 titled "Rolling coil transport car" which discloses a carriage body having a skid fixed to the upper portion of the carriage body. The skid has four receiving surface made up of metal on its upper surface. The receiving surface is arranged in an inclined direction so that central axis side of the carriage is positioned downward so that valley is formed in the running direction of the carriage. The rolled coiled is placed with its axis oriented in the travelling direction of the carriage and the rotation of the coil in direction perpendicular to the axis is restricted.

Patent No JP5942398 titled "Skid for placing metal band coil and conveyance carriage with skid" discloses a skid having a V shaped metal band coil placing surface. The surface of the placing surface is provided with a metal band coil scratch prevention layers.

The above-mentioned shortcomings, disadvantages and problems are addressed herein, as detailed below.

OBJECTS OF THE INVENTION

The primary objective of the embodiments herein is to provide a saddle to carry, support, store and transport a plurality of heavy materials in cylindrical form as well as other preferred shapes without affecting quality of the steel stand or the loaded materials.

Another objective of the embodiments herein is to provide a saddle with a modular assembly for handling heavy loads of different sizes at variable temperatures and climatic conditions.

Another objective of the embodiments herein is to provide a saddle with variable settings and interchangeability between the settings with minimal time lag.

Another objective of the embodiments herein is to ensure higher level of safety condition by avoiding any kinds of movement of the loaded material during transit.

These and other objects and advantages of the embodiments herein will become readily apparent from the following detailed description taken in conjunction with the accompanying drawings.

SUMMARY OF THE INVENTION

The various embodiments herein provide a support and storage stand comprising at-least two pair of inner legs, at-least two pair of outer legs, a bridge strip, at-least two load carrying plates, and a detachable cushion pad. The pair of inner legs is placed in opposite direction to each other forming an inner leg of the stand. The pair of outer legs is placed in opposite direction to each other forming an outer leg of the stand. The bridge strip connects the pair of inner legs and the pair of outer legs at both sides of the stand to form an integrated assembly. The at-least two load carrying plates provide a load carriage functions. The load carrying plates are placed on top of the inner legs and the outer legs at both side of the said stand in an inclination with each other and is exposed directly to a loading material. The cushion pad acts as anti-skid and anti-friction material between the at-least two load carrying plate and the loading material.

According to one embodiment herein, the inner legs and the outer legs are hollow tube and are welded from each end.

According to one embodiment herein, the outer legs restricts rolling of the loading material and supports a portion of the compressive load.

According to one embodiment herein, an edge of the bridge strip is welded on interior sides of the inner legs and the outer legs on both sides to form the integrated assembly.

According to one embodiment herein, a length of the bridge strip is adjustable according to a diameter of the loading material.

According to one embodiment herein, the load carrying plate is square shaped and sustains temperature to up to 180° C.

According to one embodiment herein, the detachable cushion pad is placed on a top of the load carrying plate as a shock absorbing fixture.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE DRAWINGS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
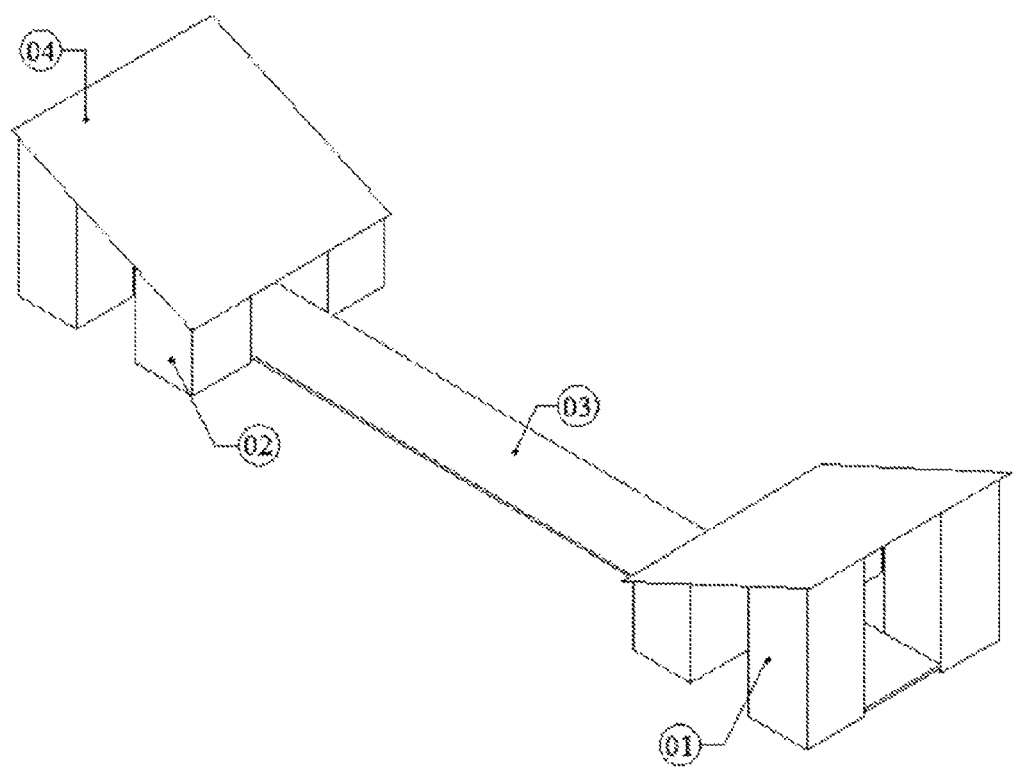
FIG. 1 illustrates the perspective view of a steel stand assembly, according to one embodiment herein.

FIG. 1 illustrates a perspective view of a steel stand assembly or saddle for carrying variable loads, according to one embodiment herein. The steel stand assembly comprises of the following parts, namely, at-least two pair of inner legs forms the inner legs (02) of the steel stand assembly, at-least two pair of outer legs forms the outer legs (01) of the steel stand assembly, a bridge strip (03), at-least two square shaped load carrying plates (04) and at-least two detachable cushion pads (05). One pair of hollow inner legs and the hollow outer legs at-least one portion of the steel stand is connected to another pair of the hollow outer legs and the hollow inner legs of another portion of the steel stand through a bridge strip, to form one complete assembly on which steel coils or cylindrical objects are stored and transported.

Figure 2:
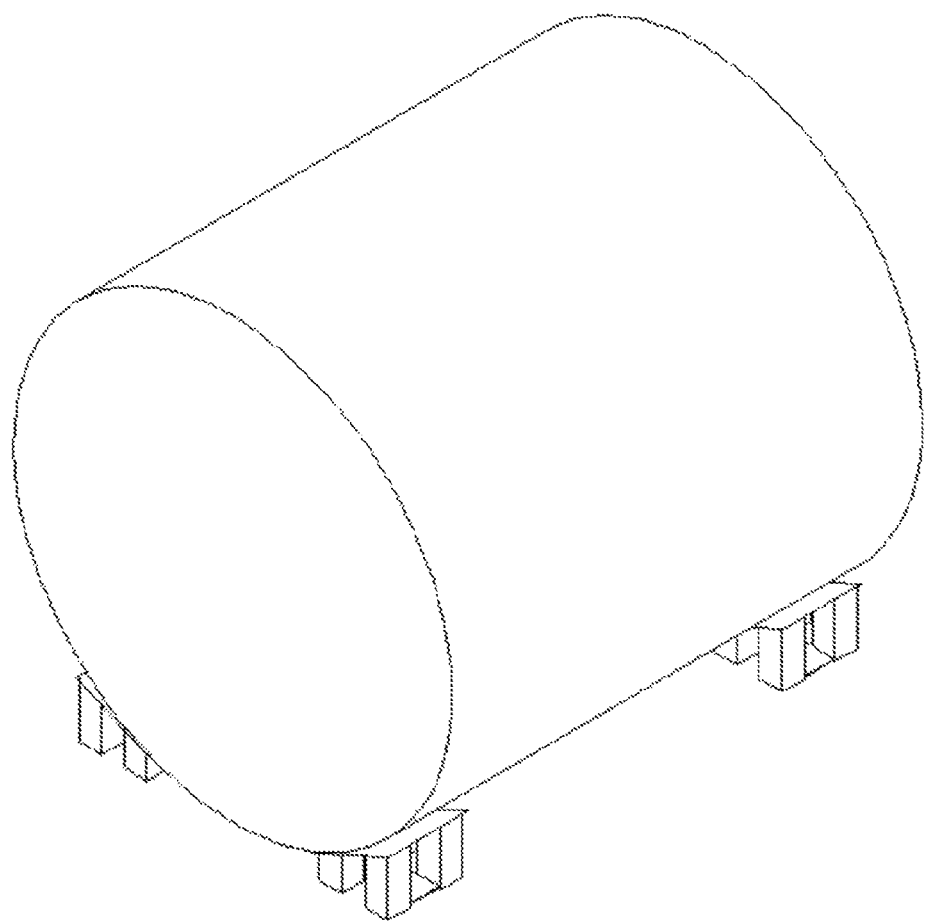
FIG. 2. illustrates the diagram in which steel coil is placed on top of the steel stand, according to one embodiment herein.

FIG. 2 illustrates a positioning of a steel coil is placed on top of the steel stand, according to one embodiment herein. The assembly is used for handling, carrying, supporting, storing and transporting steel, steel coils, pipes, cylinders, cylindrical objects and/or such other heavy materials.

The load carrying plates (04) which form the upper layer plates, rest on the inner legs (02) and outer legs (01) in an inclined sloping direction toward each other and are exposed directly to the loading material. The inner legs (02) are the shortest length load carrying part of the assembly and mostly support the compressive load. The outer legs (01) function as anti-rolling for load carrying material and also support some portion of the compressive load. The inner legs (02) and the outer legs (01) are hollow tubes and are closed from one end by welding the square shaped steel plate on a top side of the hollow tube. The bridge strip (03) connects the inner legs (02) and outer legs (01) at about 5 mm above the ground surface on both sides to form one assembly. The space between the two inclined load carrying plates allows the cylindrical loading material of different diameters to slide and occupy the space on the load carrying plates. The loading material is properly placed and balanced to avoid any displacement and movement of the loading material while in transport.

The outside of the outer legs (01) and inner legs (02) are covered by the load carrying plates (04) and the steel stand assembly is fixed to the transporting vehicle surface or on location with steel making the displacement or movement of the loading material completely impossible during its transportation.

The steel stand assembly is subjected to constant comprehensive load of 100 kN for one hour for a 2.5 mm thick steel stand. The experiment showed no deformation or cracks on the steel stand assembly. The maximum load carrying capacity of the steel stand assembly was observed to be about 360 kN. Further, the thickness is increased to 3 mm or 3.2 mm or 3.5 mm based on load carrying requirement. Mostly, the steel stand with 3.2 mm thickness tub is used for sustaining maximum weight of the steel coil up to 35 MT.

The inner and outer legs collectively comprising a steel stand has an inclined square shaped load carrying plate placed on the steel stand. Two steel stands are located opposite to each other and are joined to the bridge strip through a welding process. The steel stand or saddle is used for carrying, supporting, storing and transporting steel, steel coils, pipes, cylinders, cylindrical objects and/or such other heavy materials at variable temperatures which has made it possible to overcome the shortcomings, disadvantages and limitations faced while using a conventional method.

According to one embodiment herein, the assembly structure of the steel stand enables it to carry ranges of loading materials of various types such as strip coil, solid, hollow and of various sizes in cylindrical form. The material used in manufacturing the steel stand sustains hot temperature to almost about 180° C. without undergoing any visual deformation or affecting the mechanical properties of the steel saddle/pallets/skid (the steel stand) or of the loading materials. The material used in manufacturing of the steel stand is easily available in the market at a reasonable cost. The steel stand is redesignable by keeping the basic design same and replacing the steel with material having properties similar to steel which can sustain heavy load and temperature of more than 180° C. The steel stand sustains increasing order of weight of the loading material without changing its shape or without dismantling and disassembling itself.

According to one embodiment herein, the manufacturing and construction step of the steel stand is simple and can be easily assembled, disassembled and installed at the site. The design, surface structure, configuration of the steel stand has been kept simple. The steel stand's parts have predetermined dimensional fittings and are welded together to avoid any requirement of specialized and skilled manpower for its use at the desired location. The assembly of the steel stand consists of two set of four hollow support stands (the two inner legs and the two outer legs) vertically standing in opposite direction to each other, connected by the bridge strip of desired length and breadth, with the square shaped load caring load carrying plate placed on top of the four-hollow support stands at each end and welded at its top edge in the inclined sloping direction toward each other. The hollow support stands are closed at its all end by welding with a square shaped steel plate covering its top and bottom side before placing the load carrying load carrying plate on its top. The top of the four hollow support stands is welded to the surface of the square shaped load caring load carrying plate in an inclined sloping position at about 20 to 25° angle with the bridge strip. The edge of the bridge strip is welded on the interior side of the hollow support stand (the inner legs and outer legs) at about 5 mm above the ground surface on both sides. The space between the two inclined load carrying plates allows the cylindrical loading material of different diameters to slide and occupy the space on the load carrying plate from upper to lower direction as per their diameter in the manner that the force of the entire loading material is directed in a downward direction, which restricts movement of the loading material in a lateral direction during transit. A plurality of provisions are made to restrict a movement of the loading material lateral and longitudinal directions or along the axis by tying the loaded materials to the steel stand with strong materials such as rope, cushion or plastic materials.

According to one embodiment herein, the detachable cushioning or cushion pads are either simple or grooved or matrix and placed on the surface of the load carrying load carrying plate as per the customer's specific requirement for avoiding any marks, patches or impressions on the steel stand or on the loading material. The steel stand is either painted for protection against rusting and for giving an aesthetic appeal to the steel stand or is subjected to a hot dip galvanizing process, in which the steel stand is given a zinc coating to increase a shelf life of the steel stand.

According to one embodiment herein, various measures are taken into consideration to ensure higher level of safety condition to be maintained during its usage. The steel stand is easy to handle, store and position without the requirement of specific ground surface or other requirements for its alignments and positioning at a very low investment. The steel stand has easy tracking and identification steps to avoid any foreseeable accidents and/or slippage. The parts of the saddle/pallet/skid (the steel stand) are welded while assembling to provide stability and sturdity for the loading materials while storing or during long distance transit. The steel stand is also fixed to the transport vehicle by "L" shaped stopper by welding the steel stand onto the surface of the vehicle to ensure complete stability. A plurality of the steel stand may be placed parallelly onto the transporting vehicle such as railway train or bus to connect long and continuous length of cylindrical object as per the requirement without breaking while transporting.

According to one embodiment herein, the steel stand is eco-friendly, 100% reusable and recyclable, and use and implementation of which will completely remove the difficulties faced in disposal of the steel stand after its use with no adverse impact on the environment.

According to one embodiment herein, the inner legs and the outer legs have a thickness of 2.5 mm, a load on the steel coil is bearable up to 45 MT, and a maximum allowable temperature of the steel stand or saddle bearing rested hot steel is 150° C. Further, a thickness of the load carrying plates and tubes varies with increase in a weight of the carried load.

The saddle provided in the embodiments herein is very efficient in loading, carrying, storing and transporting steel stands and other suitable heavy materials without affecting the quality of the saddle and loading steel stands. The steel stand assembly is 100% reusable and recyclable in nature fulfils the objective of the invention by providing flexibility in handling variable sized loads and at different temperature range and climatic conditions.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

We claim:

1. A support and storage stand for supporting a loading material that includes one or more cylindrical objects, the stand comprising:
a first group of legs including a first pair of inner legs having top and bottom ends, and a first pair of outer legs having top and bottom ends, wherein the first pair of inner legs are relatively shorter in height than the first pair of outer legs, wherein the first pair of inner legs is placed substantially parallel to each other in the stand anterior to the first pair of outer legs;

a second group of legs including a second pair of inner legs having top and bottom ends, and a second pair of outer legs having top and bottom ends, wherein the second pair of inner legs are relatively shorter in height than the second pair of outer legs, wherein the second pair of inner legs is placed substantially parallel to each other in the stand anterior to the second pair of outer legs;

wherein the first pair of outer legs is placed substantially parallel to each other in the stand posterior to the first pair of inner legs;

wherein the second pair of outer legs is placed substantially parallel to each other in the stand posterior to the second pair of inner legs;

a bridge strip having a first end and a second end, wherein the bridge strip connects the first group of legs to the second group of legs by having the first end of the bridge strip extending between the first pair of inner legs and also extending between the first pair of outer legs, and the second end of the bridge strip extending between the second pair of inner legs and also extending between the second pair of outer legs to form an integrated assembly; and two load carrying plates including a first load carrying plate and a second load carrying plate, wherein the first load carrying plate is placed on the too ends of the first pair of inner legs and the first pair of outer legs at a first preselected inclined angle, and wherein the second load carrying plate is placed on the top ends of the second pair of inner legs and the second pair of outer legs at a second preselected inclined angle;

wherein each of the first pair of inner legs, each of the first pair of outer legs, each of the second pair of inner legs, and each of the second pair of outer legs are hollow tubes.

2. The stand according to claim 1, wherein each of the first pair of inner legs, each of the second pair of inner legs, each of the first pair of outer legs, and each of the second pair of outer legs has four sides, and opposing side edges of the bridge strip is welded to inner sides of each of the first pair of inner legs, each of the second pair of inner legs, each of the first pair of outer legs, and each of the second pair of outer legs to form the integrated assembly.

3. The stand according to claim 1, wherein a length of the bridge strip has a preselected length according to dimensions of the loading material.

4. The stand according to claim 1, wherein each of the two load carrying plates is square shaped.

5. The stand according to claim 1, wherein each of the two load carrying plates sustains temperature up to 180° C.

6. The stand according to claim 1, wherein the first load carrying plate is welded to each of the first pair of inner legs and each of the first pair of outer legs, and the second load carrying plate is welded to each of the second pair of inner legs and each of the second pair of outer legs.

* * * * *